(12) United States Patent
Kwak et al.

(10) Patent No.: US 10,475,583 B2
(45) Date of Patent: *Nov. 12, 2019

(54) DIELECTRIC COMPOSITES, AND MULTI-LAYERED CAPACITORS AND ELECTRONIC DEVICES COMPRISING THEREOF

(71) Applicant: SAMSUNG ELECTRONICS CO., LTD., Suwon-si, Gyeonggi-do (KR)

(72) Inventors: Chan Kwak, Yongin-si (KR); Hyun Sik Kim, Suwon-si (KR); Jong Wook Roh, Anyang-si (KR); Kyoung-Seok Moon, Hwaseong-si (KR); Hyeon Cheol Park, Hwaseong-si (KR); Yoon Chul Son, Hwaseong-si (KR); Daejin Yang, Yeongju-si (KR); Doh Won Jung, Seoul (KR); Youngjin Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,386

(22) Filed: Jan. 19, 2018

(65) Prior Publication Data
US 2018/0204679 A1    Jul. 19, 2018

(30) Foreign Application Priority Data

Jan. 19, 2017  (KR) .................. 10-2017-0008971
Jan. 18, 2018  (KR) .................. 10-2018-0006490

(51) Int. Cl.
*H01G 4/12* (2006.01)
*C04B 35/46* (2006.01)
(Continued)

(52) U.S. Cl.
CPC .............. *H01G 4/30* (2013.01); *C04B 35/47* (2013.01); *C04B 35/62805* (2013.01);
(Continued)

(58) Field of Classification Search
CPC .... C04B 35/4682; C04B 35/47; H01G 4/1227
See application file for complete search history.

(56) References Cited

U.S. PATENT DOCUMENTS 4,309,295 A  1/1982  McSweeney
4,362,637 A  12/1982 Matsuo et al.
(Continued)

FOREIGN PATENT DOCUMENTS

EP      0634756 A2   1/1995

OTHER PUBLICATIONS

Extended European Search Report dated Jun. 22, 2018, of the corresponding European Patent Application No. 18152527.0.

*Primary Examiner* — Karl E Group
(74) *Attorney, Agent, or Firm* — Cantor Colburn LLP (57) ABSTRACT

A dielectric composite including a plurality of crystal grains including a semiconductor or conductive material, and a grain boundary insulation layer between the crystal grains, wherein the grain boundary insulation layer includes a two-dimensional layered material covering at least a portion of a surface of at least one of the crystal grains, and a multi-layered capacitor and an electronic device including the same.

24 Claims, 4 Drawing Sheets

(51) Int. Cl.
  *H01G 4/30* (2006.01)
  *H01G 4/14* (2006.01)
  *C04B 35/47* (2006.01)
  *C04B 35/628* (2006.01)
  *H01C 7/00* (2006.01)
  *H01C 7/10* (2006.01)
  *H01C 7/18* (2006.01)
  *H01C 17/065* (2006.01)
  *H01G 4/248* (2006.01)
  *H01G 4/232* (2006.01)

(52) U.S. Cl.
  CPC ....... *C04B 35/62815* (2013.01); *H01C 7/008* (2013.01); *H01C 7/1006* (2013.01); *H01C 7/18* (2013.01); *H01C 17/06533* (2013.01); *H01G 4/1218* (2013.01); *H01G 4/1227* (2013.01); *H01G 4/1236* (2013.01); *H01G 4/1245* (2013.01); *H01G 4/14* (2013.01); *C04B 2235/3201* (2013.01); *C04B 2235/3208* (2013.01); *C04B 2235/3251* (2013.01); *C04B 2235/3255* (2013.01); *C04B 2235/6582* (2013.01); *C04B 2235/6588* (2013.01); *C04B 2235/781* (2013.01); *C04B 2235/79* (2013.01); *C04B 2235/85* (2013.01); *C04B 2237/346* (2013.01); *C04B 2237/68* (2013.01); *H01G 4/232* (2013.01); *H01G 4/248* (2013.01)

(56) References Cited

U.S. PATENT DOCUMENTS

| | | | |
|---|---|---|---|
| 4,403,236 | A | 9/1983 | Mandai et al. |
| 5,509,558 | A * | 4/1996 | Imai ................ C04B 35/01 218/143 |
| 6,292,355 | B1 | 9/2001 | Kang et al. |
| 6,795,296 | B1 | 9/2004 | Palanduz et al. |
| 8,885,322 | B2 | 11/2014 | Chai |
| 2010/0226067 | A1 | 9/2010 | Osada et al. |
| 2011/0147060 | A1 | 6/2011 | Osada et al. |
| 2012/0217615 | A1* | 8/2012 | Tatekawa ............ C03C 3/087 257/532 |
| 2013/0234293 | A1* | 9/2013 | Kawamoto ........... B82Y 30/00 257/602 |
| 2013/0286541 | A1* | 10/2013 | Kawamoto ............ H01C 7/10 361/321.4 |
| 2018/0257991 | A1* | 9/2018 | Roh .................... C04B 35/475 |
| 2018/0261388 | A1* | 9/2018 | Yang ................... H01G 4/1227 |
| 2018/0286586 | A1* | 10/2018 | Jung .................... C07C 211/63 |

* cited by examiner

DIELECTRIC COMPOSITES, AND MULTI-LAYERED CAPACITORS AND ELECTRONIC DEVICES COMPRISING THEREOF

CROSS-REFERENCE TO RELATED APPLICATION

This application claims priority to and the benefit of Korean Patent Application No. 10-2017-0008971, filed in the Korean Intellectual Property Office on Jan. 19, 2017, and Korean Patent Application No. 10-2018-0006490 filed on Jan. 18, 2018, and all the benefits accruing therefrom under 35 U.S.C. § 119, the entire contents of which are incorporated herein by reference.

BACKGROUND

1. Field

A dielectric composite and a multi-layered capacitor and an electronic device including the same are disclosed.

2. Description of the Related Art

A multi-layer ceramic condenser (MLCC), which is a small-size condenser having a large capacity, is an electronic device obtained by alternately laminating a dielectric ceramic composition and an internal electrode and firing the same simultaneously. However, according to the ongoing requirements for electronic devices to provide a small size, a thin film, and a higher capacity, there remains an increasing need to develop a condenser having further smaller size and greater thinness, and higher capacity than the conventional multi-layered ceramic condenser structure.

In addition, an intergranular insulation type capacitor of dielectric materials exhibiting good dielectric characteristics may form an grain boundary insulation layer between crystal grains having conductivity or semi-conductivity, e.g., conductive or semiconductive crystal grains, so the intergranular insulation type capacitor may have a high apparent relative permittivity, and down-sizing and higher capacity may be possible.

An apparent relative permittivity of the intergranular insulation type capacitor tends to be generally proportional to a particle size and inversely proportional to a thickness of the grain boundary insulation layer. However, a relative permittivity of the grain boundary insulation layer is also decreased with a decreased thickness of the grain boundary insulation layer, and the grain boundary insulation layer may have problems in that the thickness of the grain boundary insulation layer may be maintained in a predetermined level taking into account or considering the relative permittivity of the intergranular insulation type capacitor.

SUMMARY

An embodiment provides a dielectric composite having a high capacity characteristic and also being capable of being down-sized and having a thickness of a film therein being decreased, by including a material exhibiting a high relative permittivity even in a region having a thickness of several to several tens of nanometers.

An embodiment provides a multi-layered capacitor and an electronic device including the dielectric composite.

According to an embodiment, a dielectric composite includes a plurality of crystal grains including a semiconductor or conductive material, and a grain boundary insulation layer between the crystal grains, wherein the grain boundary insulation layer includes a two-dimensional layered material covering at least a portion of a surface of at least one of the crystal grains.

The two-dimensional layered material may include a single layer.

The two-dimensional layered material may include two or more laminated layers.

The two-dimensional layered material may directly contact the surface of at least one of the crystal grains.

The two-dimensional layered material may cover an entirety of the surface of at least one of the crystal grains.

The two-dimensional layered material may have a thickness of less than or equal to about 120 nanometers (nm).

The two-dimensional layered material may have a relative permittivity of greater than or equal to about 50 and less than or equal to about 1000.

The grain boundary insulation layer may further include a three-dimensional bulk material mixed with the two-dimensional layered material.

The two-dimensional layered material may be present in a range of about 10 volume % to about 100 volume % based on 100 volume % of the grain boundary insulation layer.

The two-dimensional layered material may be one delaminated from a material including an aurivillius phase, a material including a Ruddlesden-Popper phase, a material including a Dion-Jacobson phase, and titano-niobate, or a combination thereof.

The two-dimensional layered material may be represented by Chemical Formula 1:

$$X_m(A_{(n-1)}B'_nO_{(3n+1)})$$  Chemical Formula 1

In Chemical Formula 1, X may include H, an alkali metal, a cationic compound, or a combination thereof, A may include Ca, Na, Ta, Bi, Ba, Sr, or a combination thereof, B' may include W, Mo, Cr, Ta, Nb, V, Zr, Hf, Pb, Sn, La, Ti, or a combination thereof, 0≤m≤2, and n≥1.

The cationic compound X may include a tetramethylammonium compound, a tetraethylammonium compound, a tetrapropylammonium compound, a tetrabutylammonium compound, a methylamine compound, an ethylamine compound, a propylamine compound, a butylamine compound, a polyethylenimine compound, or a combination thereof.

The two-dimensional layered material represented by Chemical Formula 1 is electrically neutral.

The crystal grains may include a material including barium titanate, strontium titanate, lead titanate, lead zirconate, lead zirconate titanate, or a combination thereof.

The crystal grains may have an average particle diameter in a range of about 50 nm to about 2 micrometers (μm).

The dielectric composite may have a relative permittivity of greater than or equal to about 1,000 and less than or equal to about 20,000.

An embodiment provides a multi-layered capacitor including laminated alternate layers including an internal electrode, and a dielectric layer, wherein the dielectric layer includes the dielectric composite.

The internal electrode and the dielectric layer may include three or more laminated layers.

The dielectric layer may have a thickness of less than about 500 nanometers.

The dielectric layer may have a thickness of less than about 500 nm and may have a relative permittivity of greater than or equal to about 4,000 and less than or equal to about 40,000.

Further, an embodiment provides an electronic device including the dielectric composite according to the embodiment.

The electronic device may include a varistor, a thermistor, or a capacitor for storing energy.

The grain boundary insulation layer may surround one or more of the crystal grains.

The grain boundary insulation layer may have a thickness in a range of about 5 nanometers to about 99 nanometers.

The dielectric composite according to an embodiment includes a two-dimensional layer device in which a relative permittivity is not decreased even if a thickness of the grain boundary insulation layer is decreased, so the grain boundary insulation layer may be formed in, e.g., include, an ultra-thin film, thereby it may overcome limits of the conventional intergranular insulation type capacitor.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Advantages and characteristics of this disclosure, and a method for achieving the same, will become evident referring to the following example embodiments together with the drawings attached hereto. However, the embodiments should not be construed as being limited to the embodiments set forth herein. If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and variations such as "comprises" or "comprising", will be understood to imply the inclusion of stated elements but not the exclusion of any other elements.

Further, the singular includes the plural unless otherwise defined.

In the drawings, the thickness of layers, films, panels, regions, etc., are exaggerated for clarity. Like reference numerals designate like elements throughout the specification.

It will be understood that when a first element such as a layer, film, region, or substrate is referred to as being "on" second element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. "At least one" is not to be construed as limiting "a" or "an." "Or" means "and/or." As used herein, the term "and/or" includes any and all combinations of one or more of the associated listed items.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, relative permittivity refers to a dielectric constant of a material or the absolute permittivity of a material expressed as a ratio relative to the permittivity of vacuum.

As used herein, unless otherwise defined, "particle diameter" refers to a maximum size that a particle may have. For example, particle diameter refers to a longitudinal length when the crystal grain has a shape of oval or a uniaxially elongated shape similar to the oval such as a sheet, a plate, or a needle, a diameter length in a case of a circle/spherical shape, or a farthest distance of the line connecting any two points in the crystal grain boundary in a case of polygonal or amorphous shape.

In addition, the particle diameter of the crystal grain in the present specification may be quantified by a metrology to provide an average size of a group of crystal grains, but the generally-used way may include a mode diameter showing the maximum value of the distribution, a median diameter corresponding to the median of the integrated distribution curved-line, and various average diameter (numeric average, length average, area average, mass average, volume average, etc.). Unless otherwise defined, the phrase "average particle diameter" refers to a numeral average diameter which is measured as D50 (particle diameter at which the distribution is 50%).

Hereinafter, a composition of a dielectric composite according to an embodiment is described with references to FIGS. 1 to 3.

Figure 1:
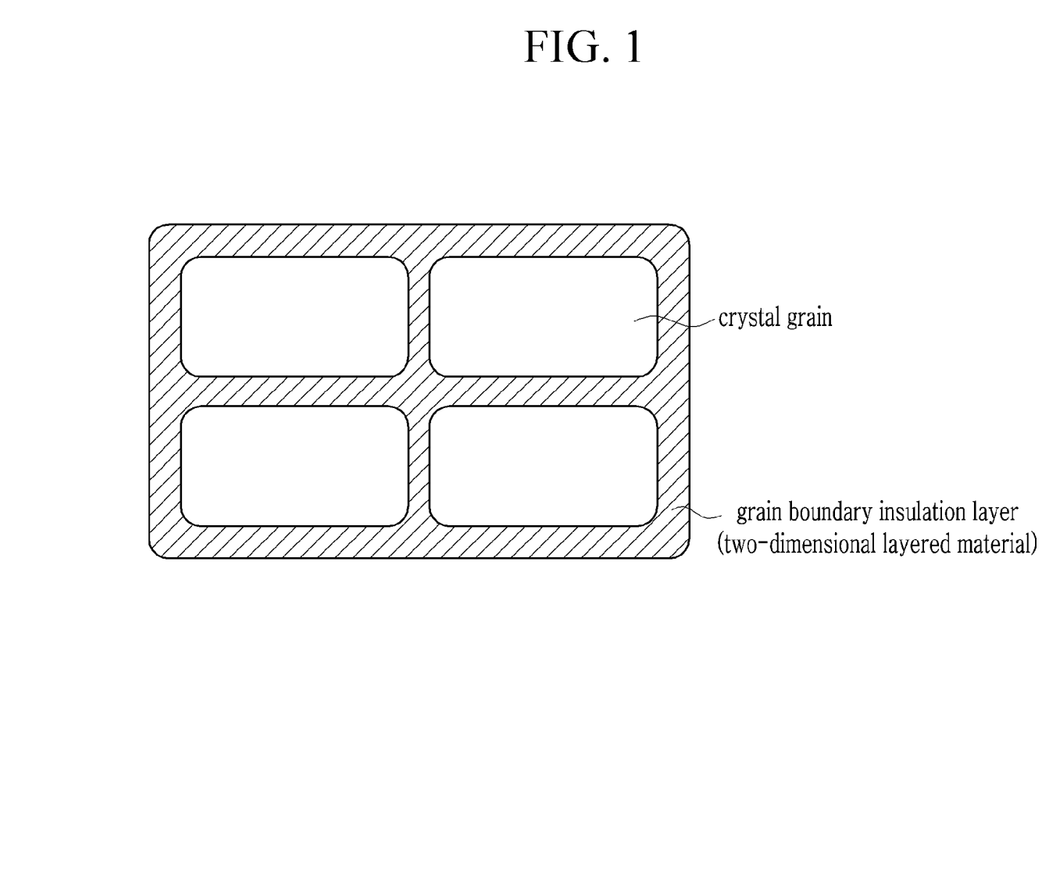
FIG. 1 is a schematic view showing a fine structure of a dielectric composite according to an embodiment.

FIG. 1 is a schematic view showing a fine structure of a dielectric composite according to an embodiment.

A dielectric composite according to an embodiment includes a plurality of crystal grains including a material having semi-conductivity or conductivity and a grain boundary insulation layer between the crystals grains, e.g., surrounding the crystal grains or a boundary of the crystal grains.

Additionally, the plurality of crystal grains and grain boundaries are connected to each other directly and/or in parallel, so the crystal grains and grain boundaries may carry out a function of a capacitor having a predetermined capacitance as the whole. In other words, the dielectric composite according to an embodiment is an intergranular insulation type capacitor providing a capacitance to the grain boundary insulation layer formed between two crystal grains when applying a predetermined voltage to two adjacent crystal grains.

An embodiment is not necessarily limited thereto, but may be formed in a multi-layered capacitor by laminating the dielectric layers including dielectric composites in two or more layers as will be described in further detail.

Referring to FIG. 1, a plurality of crystal grains is disposed in plural. A plurality of crystal grains may include a material having semi-conductivity or conductivity, i.e., the material may be a semiconductor or conductive material. A material constituting the crystal grain may be a metal oxide including, for example, barium titanate, strontium titanate, lead titanate, lead zirconate, lead zirconate titanate, or a combination thereof.

According to an embodiment, the material constituting the crystal grain may further include a donor element. In other words, the metal oxide constituting the crystal grain may have oxygen vacancy, and the donor element may be incorporated, e.g., solid-dissolved, in the crystal grain. Thereby, the crystal grain may become a semiconductor. Examples of the donor element may include La, Sm, Dy, Ho, Y, Nd, Ce, Nb, Ta, W, or the like.

In addition, an average particle diameter of the crystal grains according to an embodiment may be varied or variously determined taking into account or considering an apparent relative permittivity of the dielectric composite which will be described in further detail below, but the average particle diameter of the crystal grains may be adjusted within an appropriate range so that the dielectric composite may be down-sized and a thickness of a thin film decreased.

An average particle diameter of the crystal grains may be for example less than or equal to about 2.0 µm, less than or equal to about 1.9 µm, less than or equal to about 1.8 µm, less than or equal to about 1.7 µm, less than or equal to about 1.6 µm, less than or equal to about 1.5 µm, less than or equal to about 1.4 µm, less than or equal to about 1.3 µm, less than or equal to about 1.2 µm, less than or equal to about 1.1 µm, less than or equal to about 1.0 µm, less than or equal to about 900 nm, less than or equal to about 800 nm, less than or equal to about 700 nm, less than or equal to about 600 nm, less than or equal to about 500 nm, and for example greater than or equal to about 50 nm, greater than or equal to about 60 nm, greater than or equal to about 70 nm, greater than or equal to about 80 nm, greater than or equal to about 90 nm, or greater than or equal to about 100 nm.

The grain boundary insulation layer includes a two-dimensional layered material covering at least a portion of the crystal grain surface.

As used herein, unless otherwise defined, a "two-dimensional layered material" refers to a material having a two-dimensional crystal structure which is a material, e.g., a sheet or film including one or more layered structures, specifically including 1 to 9 atomic layers.

That is, the two-dimensional layered material may be formed in a single layer or in a multi-layered structure in which each single layer is stacked to form a multi-layer. In an embodiment, nine or fewer layers are stacked to form the multi-layered structure.

In addition, when the two-dimensional layered material has the multi-layered structure, each of the layers may be physically and/or chemically bound with each other. In this case, a portion of the layers may have a crystalline structure different from the two-dimensional crystal structure.

According to an embodiment, the grain boundary insulation layer may include a two-dimensional layered material as shown in FIG. 1. However, an embodiment is not necessarily limited thereto, in that the grain boundary insulation layer may include the two-dimensional layered material together with a three-dimensional bulk material having a different crystal structure from the two-dimensional layered material, as shown in FIGS. 2 and 3.

Figure 2:
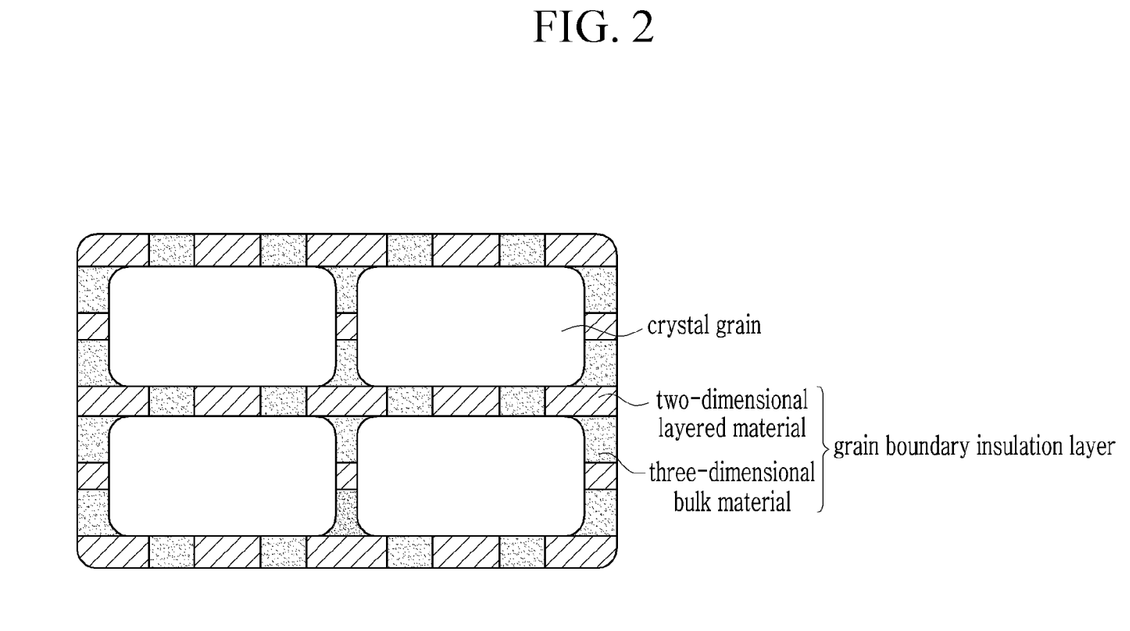
FIGS. 2 and 3 are schematic views showing various fine structures of dielectric composites according to embodiments.
Figure 3:
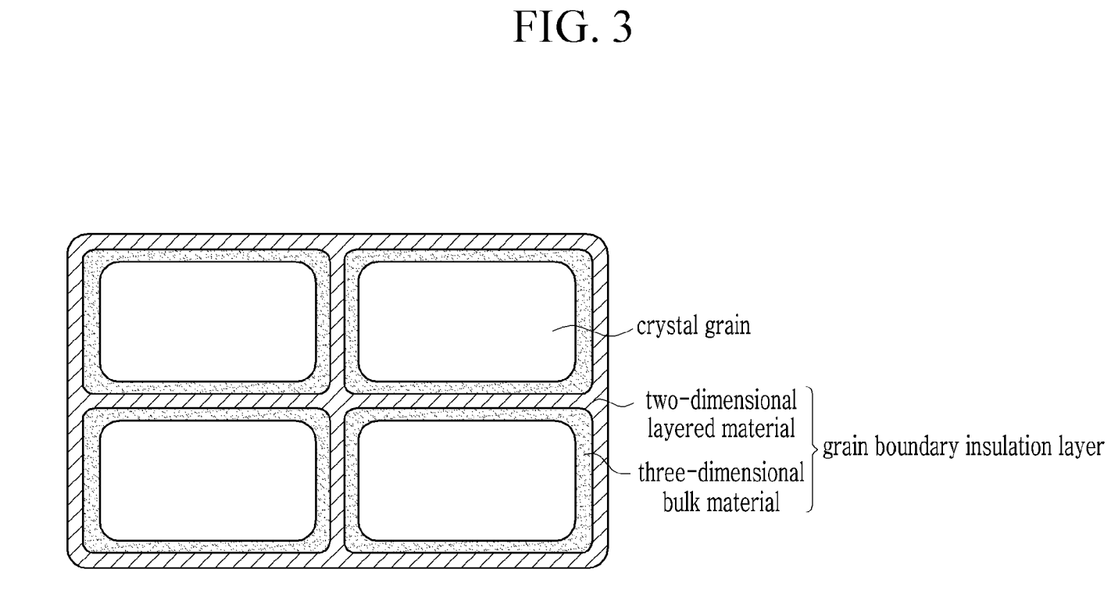

FIGS. 2 and 3 are schematic views showing various fine structures of dielectric composites according to some embodiments.

Referring to FIGS. 2 and 3, the three-dimensional bulk material may be combined, e.g., mixed, with the two-dimensional layered material to form the grain boundary insulation layer. The three-dimensional bulk material may have a multi-crystalline structure including three-dimensional crystal particles, but the multi-crystalline structure may not have a two-dimensional crystal structure since the multi-crystalline structure may not include a two-dimensional layered material.

Further according to an embodiment, the three-dimensional bulk material may be a material in which an acceptor element is included in the material for the crystal grain. Examples of the acceptor element may include Mn, Co, Ni, Cr, and the like.

In other words, the three-dimensional bulk material may be formed contacting two adjacent crystal grains, e.g., indirectly physically connecting the adjacent crystal grains to each other. However, the three-dimensional bulk material includes an acceptor element aiding, e.g., accelerating, formation of a Schottky barrier, which improves a resistivity, so that the three-dimensional bulk material may have or provide excellent insulation unlike the crystal grain.

Still further according to an embodiment, an amount of the two-dimensional layered material, e.g., a ratio of the two-dimensional layered material to the three-dimensional bulk material, in the grain boundary insulation layer is not particularly limited, but may be varied or variously determined taking into account or considering the each relative permittivity of the two-dimensional layered material and the three-dimensional bulk material, a raw material, an estimated thickness of the grain boundary insulation layer, and the like, but the amount of the two-dimensional layered material may be adjusted such that two-dimensional layered material exhibits excellent relative permittivity even if the grain boundary insulation layer is formed in a size of several to several tens of nanometers.

An amount of the two-dimensional layered material in the grain boundary insulation layer may be for example greater than or equal to about 10 volume %, greater than or equal to about 15 volume %, greater than or equal to about 20 volume %, greater than or equal to about 25 volume %, greater than or equal to about 30 volume %, greater than or equal to about 35 volume %, greater than or equal to about 40 volume %, greater than or equal to about 45 volume %, greater than or equal to about 50 volume %, greater than or equal to about 55 volume %, greater than or equal to about 60 volume %, greater than or equal to about 65 volume %, greater than or equal to about 70 volume %, greater than or equal to about 75 volume %, greater than or equal to about 80 volume %, greater than or equal to about 85 volume %, greater than or equal to about 90 volume %, greater than or equal to about 95 volume %, or about 100 volume % based on 100 volume % of the grain boundary insulation layer.

Meanwhile, the two-dimensional layered material may directly contact, e.g., be directly contacted with, the crystal grain surface as shown in FIGS. 1 and 2; and at least a portion thereof may be disposed leaving in a predetermined interval space from the crystal grain surface as shown in FIG. 3.

In addition, the two-dimensional layered material may be formed to cover only a partial region of the crystal grain surface to cover a portion of the crystal grain surface as shown in FIG. 2, or may be formed to cover the whole surface of the crystal grain as shown in FIG. 1 or FIG. 3.

In an embodiment, the two-dimensional layered material may be a compound represented by Chemical Formula 1.

$$X_m(A_{(n-1)}B'_nO_{(3n+1)})$$  Chemical Formula 1

In Chemical Formula 1, X includes H, an alkali metal, a cationic compound, or a combination thereof, A includes Ca, Na, Ta, Bi, Ba, Sr, or a combination thereof, B' includes W, Mo, Cr, Ta, Nb, V, Zr, Hf, Pb, Sn, La, Ti, or a combination thereof, $0 \leq m \leq 2$, and $n \geq 1$.

The cationic compound as used herein includes polymers, and may be positively charged or capable of being positively charged under the conditions of use. The cationic compound may include a (C1 to C16 alkyl)ammonium compound, a (C1 to C16 alkyl) phosphonium compound, a (C1 to C16 alkyl)amine compound, an amine polymer, or a combination thereof. The alkylamine compound may be a primary, secondary, or tertiary amine.

The cationic compound may include a tetramethylammonium compound, a tetraethylammonium compound, a tetrapropylammonium compound, a tetrabutylammonium compound, a methylamine compound, an ethylamine compound, a propylamine compound, a butylamine compound, a polyethylenimine compound, or a combination thereof.

In Chemical Formula 1, a stoichiometric ratio of X, A, B' and O may be adjusted to provide electrical neutrality for the whole of the two-dimensional layered material. That is, the material represented by Chemical Formula 1 may be electrically neutral.

According to an embodiment, a thickness of the two-dimensional layered material is not particularly limited, but may be varied or various determined taking into account or considering a material of the crystal grain, an average particle diameter of the crystal grains, a material of the two-dimensional layered material, an amount of the two-dimensional layered material in the grain boundary insulation layer, and the like, but a thickness of the two-dimensional layered material may be adjusted enough to improve an appearance dielectric constant of a dielectric composite which will be described in further detail by reducing the thickness of the grain boundary insulation layer.

A thickness of the two-dimensional layered material may be for example less than or equal to about 120 nm, less than or equal to about 110 nm, less than or equal to about 100 nm, less than or equal to about 50 nm, less than or equal to about 40 nm, less than or equal to about 30 nm, less than or equal to about 20 nm, or less than or equal to about 10 nm or may have for example a thickness of several nanometers to several tens of nanometers, for example, in a range of about 2 nm to about 80 nm, in a range of about 3 nm to about 70 nm in a range of about 4 nm to about 60 nm, or in a range of about 5 nm to about 50 nm.

A thickness of the two-dimensional layered material may be calculated by analyzing an image taken with an AFM (Atomic Force Microscope).

The two-dimensional layered material may exhibit a relative permittivity caused by the two-dimensional crystal structure. The relative permittivity of the two-dimensional layered material is not particularly limited, but may be varied or variously determined taking into account or considering a raw material of the two-dimensional layered material, a kind of the two-dimensional crystal structure, the number of the laminated layers, an average particle diameter of the crystal grains, a material for the crystal grain, and the like, but the relative permittivity of the two-dimensional layered material is determined to provide the grain boundary insulation layer with a capacitance as much at least to operate as a capacitor when applying a predetermined voltage to crystal grains.

A relative permittivity of the two-dimensional layered material may be for example greater than or equal to about 10, greater than or equal to about 20, greater than or equal to about 30, greater than or equal to about 40, greater than or equal to about 50, greater than or equal to about 60, greater than or equal to about 70, greater than or equal to about 80, greater than or equal to about 90, or greater than or equal to about 100. In an embodiment, A relative permittivity of the two-dimensional layered material may be for example less than or equal to about 1000.

A relative permittivity of the two-dimensional layered material may be calculated by using a method that disposing the two-dimensional layered material between a pair of probes contained in an AFM (Atomic Force Microscope) and thereafter applying a predetermined voltage to the pair of probes. According to an embodiment, the two-dimensional layered material may be a metal oxide nano sheet delaminated from a material having aurivillius phase, a material having a Ruddlesden-Popper phase, a material having a Dion-Jacobson phase, titano-niobate, or a combination thereof.

For example, at least one of the material having aurivillius phase, the material having Ruddlesden-Popper phase, the material having Dion-Jacobson phase, titano-niobate, or a combination thereof as a raw material is treated in an acid solution to be protonated, and reacted with an alkylammonium or an alkylamine compound to widen a gap between layers of the layered structure existing in the raw material, and then agitated with a solvent including water, alcohol, acetonitrile, dimethylsulfoxide, dimethyl formamide, propylene carbonate, or a combination thereof to form delaminated metal oxide nano sheets.

A process of delaminating $Ca_2Na_2Nb_5O_{16}$ as an example of the two-dimensional layered material according to an embodiment is described as follows: $KCa_2Na_2Nb_5O_{16}$ and an acid compound, for example, $HNO_3$ are reacted to substitute K+ with H+, so a protonated layered material of $HCa_2Na_2Nb_5O_{16}$ is obtained. The obtained $HCa_2Na_2Nb_5O_{16}$ is reacted with, for example, an alkylammonium compound such as tetraalkylammonium hydroxide to substitute the H+ with, for example, tetrabutylammonium salt (TBA+).

The alkylammonium compound may be a C1 to C16 alkylammonium salt compound. As the alkylammonium salt molecule has a large size, the alkylammonium molecule widens a gap between $Ca_2Na_2Nb_5O_{16}$ layers by entering between $Ca_2Na_2Nb_5O_{16}$ layers, causing an interlayer separation. Thereby the $Ca_2Na_2Nb_5O_{16}$ is delaminated to provide $Ca_2Na_2Nb_5O_{16}$ nano sheets when the $Ca_2Na_2Nb_5O_{16}$ is added into a solvent and agitated.

Meanwhile, the intergranular insulation type capacitor generally satisfies Equation 1 related with an apparent relative permittivity.

$$\varepsilon_r APP \square \varepsilon_r \cdot d/t \quad \text{Equation 1}$$

In Equation 1, $\varepsilon_r$APP refers to an apparent relative permittivity of the dielectric composite, $\varepsilon_r$ refers to a relative permittivity caused by a material for the grain boundary insulation layer, d refers to an average particle diameter of the crystal grains, and t refers to a thickness of the grain boundary insulation layer.

Among the conventional intergranular insulation type capacitors, the grain boundary insulation layer includes only three-dimensional bulk material, and the relative permittivity of the three-dimensional bulk material tends to depend upon the amount of the three-dimensional bulk material.

Accordingly, when the thickness (t) of grain boundary insulation layer is reduced, the amount of the material for the grain boundary insulation layer may be decreased, thereby the apparent relative permittivity of the intergranular insulation type capacitor will be also decreased. Thus the conventional, i.e., comparative intergranular insulation type capacitor may have difficulty providing the grain boundary insulation layer with an ultrathin film with a thickness less than or equal to the predetermined thickness.

On the other hand, in the dielectric composite according to an embodiment, the grain boundary insulation layer at least includes a two-dimensional layered material, so the dielectric composite may exhibit a relative permittivity greater than or equal to a predetermined level caused by the two-dimensional layer material as the intergranular insulation type capacitor even if the grain boundary insulation layer is formed in an ultrathin film having a thickness t of several to several tens of nanometers. That is, by using the two-dimensional layered material, the thickness and the relative permittivity of the grain boundary insulation layer may be independently controlled, e.g., controlled independent of one another, unlike the conventional comparative intergranular insulation type capacitor.

The relative permittivity of the dielectric composite according to an embodiment may be varied or variously determined taking into account or depending upon the average particle diameter of the crystal grains and the thickness of the grain boundary insulation layer, but the dielectric composite may have a relative permittivity that allows for the dielectric composite to be used as a capacitor even if the dielectric composite is formed in an ultra-small size and an ultra-thin film.

A relative permittivity of the dielectric composite may be for example greater than or equal to about 1,000, greater than or equal to about 2,000, greater than or equal to about 3,000, greater than or equal to about 4,000, greater than or equal to about 5,000, greater than or equal to about 6,000, greater than or equal to about 7,000, greater than or equal to about 8,000, greater than or equal to about 9,000, or greater than or equal to about 10,000. In an embodiment, a relative permittivity of the dielectric composite may be for example less than or equal to about 20,000.

Accordingly, the dielectric composite according to an embodiment may exhibit a relative permittivity greater than or equal to a predetermined level caused by the two-dimensional layered material positioned in the grain boundary insulation layer even if the grain boundary insulation layer is formed in an ultrathin film of several to several tens of nanometers.

As described above, as the dielectric composite according to an embodiment includes the two-dimensional layered material having a high relative permittivity even in a region having a thickness of several to several tens of nanometers, the dielectric composite may be formed in a small size and a thin film and also have a high capacity characteristics.

Hereinafter, a structure of the multi-layered capacitor including the dielectric composite according to an embodiment is described with reference to FIG. 4.

Figure 4:
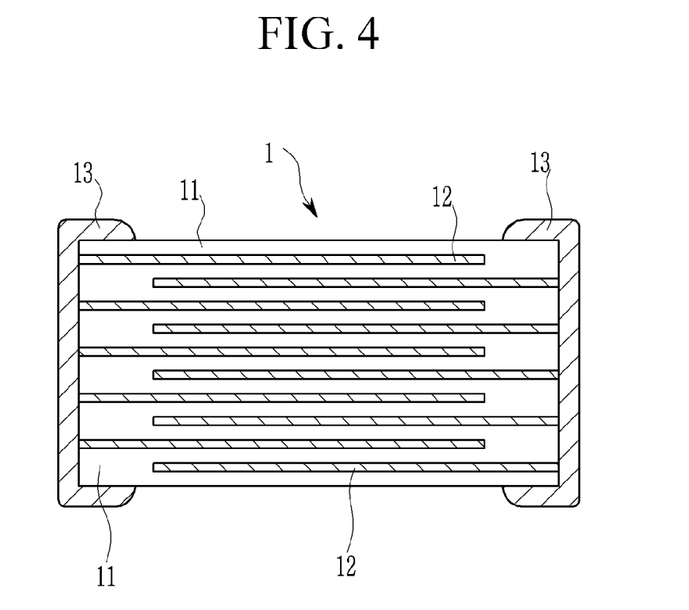
FIG. 4 is a schematic view showing a multi-layered capacitor according to an embodiment.

FIG. 4 schematically shows a multi-layered capacitor according to an embodiment.

The multi-layered capacitor 1 according to an embodiment may have a structure in which an internal electrode 12 and a dielectric layer 11 are alternated and laminated, wherein the dielectric layer 11 includes the dielectric composite shown in FIGS. 1 to 3.

In the multi-layered capacitor 1 according to an embodiment, the internal electrode 12 and the dielectric layer 11 are alternated and laminated two or more times, e.g., the internal electrode 12 and the dielectric layer 11 include three or more laminated layers. Thereby the adjacent internal electrodes and the dielectric layer disposed therebetween may function as a unit capacitor.

In addition, in the multi-layered capacitor 1 according to an embodiment, the internal electrode 12 and the dielectric layer 11 may be alternated and laminated greater than or equal to about two times, for example, greater than or equal to about three times, for example, greater than or equal to about four times, for example, greater than or equal to about five times, so the multi-layered capacitor 1 may exhibit a capacitance caused by the structure in which the internal unit capacitors are disposed in parallel.

The internal electrode 12 may be formed to have a smaller area than the area of the dielectric layer 11. Meanwhile, the internal electrodes 12 may have the same area as each other but, adjacent internal electrodes may not be completely covered and may be laminated in a zig-zag pattern as shown in FIG. 4.

The dielectric layer 11 may be formed in a larger area than the area of the internal electrode 12, and adjacent dielectric layers may be connected to each other, so the cross-sectional surface thereof may be a serpentine shape on the whole as shown in FIG. 4.

Meanwhile, according to an embodiment, the multi-layered capacitor 1 may further include a pair of external electrodes 13 contacting or surrounding both lateral sides of the stacked structure including the dielectric layer 11 and the internal electrode 12 as shown in FIG. 4. However, an embodiment is not necessarily limited thereto, but the multi-layered capacitor 1 may have a structure in which the external electrode is omitted, and the internal electrodes may extend longitudinally on or in both sides of the stacked structure of the dielectric layer and the internal electrode, or the internal electrode may be directly connected to the power source without the external electrode.

The multi-layered capacitor may include a plurality of dielectric layers and internal electrodes, and the total thickness of the dielectric layer is important factor to provide the multi-layered capacitor with down-size and thin-film. However, the dielectric layer of a comparative multi-layered capacitor includes $BaTiO_3$, $PbTiO_3$, or the like as the dielectric material, so the relative permittivity is also decreased according to the thickness decrease as described above.

Thereby, when the total thickness of the dielectric layer is decreased to provide a thin film in a comparative multi-layered capacitor, a thickness of each layer of the dielectric layer may be limited up to about 550 nm to about 600 nm, in this case, a comparative dielectric layer may have a relative permittivity ranging from about 3,000 to about 3,500. In addition, when the thickness of a comparative dielectric layer is formed in a ultra-thin film of less than or equal to the predetermined or limit range, e.g., in the range limit, the relative permittivity with respect to the thickness may be sharply decreased, and a deteriorated property that may not be used as a dielectric layer for a multi-layered capacitor may be exhibited.

However, in the multi-layered capacitor 1 according to an embodiment, the dielectric layer 11 includes the dielectric composite, and thus, a thickness of one layer of the dielectric layer 11 may be less than or equal to about 3,000 nm, less than or equal to about 2,500 nm, less than or equal to about 2,000 nm, less than or equal to about 1,500 nm, less than or equal to about 1,000 nm, or less than or equal to about 500 nm, and for example 480 nm, less than or equal to about 460 nm, less than or equal to about 440 nm, less than or equal to about 420 nm, less than or equal to about 400 nm, less than or equal to about 380 nm, less than or equal to about 360 nm, less than or equal to about 340 nm, less than or equal to about 320 nm, less than or equal to about 300 nm, or even about 200 nm to about 300 nm, which provides a thin film.

Thereby, the multi-layered capacitor 1 according to an embodiment may exhibit a relative permittivity greater than or equal to a predetermined level caused by the two-dimensional layered material for the grain boundary insulation layer in the dielectric layer 11. The other words, even if the thickness per one layer of the dielectric layer 11 is reduced within the range, a relative permittivity of, for example, greater than or equal to about 1,000, greater than or equal to about 1,500, greater than or equal to about 2,000, greater than or equal to about 2,500, greater than or equal to about 3,000, greater than or equal to about 4,000, greater than or equal to about 4,200, greater than or equal to about 4,400, greater than or equal to about 4,600, greater than or equal to about 4,800, greater than or equal to about 4,900, greater than or equal to about 5,000, greater than or equal to about 7,000, greater than or equal to about 8,000, greater than or equal to about 9,000, greater than or equal to about 10,000, greater than or equal to about 12,000, greater than or equal to about 14,000, greater than or equal to about 16,000, greater than or equal to about 18,000, or greater than or equal to about 20,000 per one layer of the dielectric layer 11 may be exhibited. In an embodiment, a relative permittivity of the dielectric layer may be for example less than or equal to about 40,000.

The multi-layered capacitor 1 may a relative permittivity caused by the dielectric layer 11. The multi-layered capacitor 1 according to an embodiment may have for example a relative permittivity of greater than or equal to about 1,000, greater than or equal to about 1,500, greater than or equal to about 2,000, greater than or equal to about 2,500, greater than or equal to about 3,000, greater than or equal to about 4,000, greater than or equal to about 4,200, greater than or equal to about 4,400, greater than or equal to about 4,600, greater than or equal to about 4,800, greater than or equal to about 4,900, greater than or equal to about 5,000, greater than or equal to about 7,000, greater than or equal to about 8,000, greater than or equal to about 9,000, greater than or equal to about 10,000, greater than or equal to about 12,000, for example 14,000, greater than or equal to about 16,000, greater than or equal to about 18,000, or greater than or equal to about 20,000. In an embodiment, a relative permittivity of the multi-layered capacitor may be for example less than or equal to about 40,000

That is, the multi-layered capacitor 1 according to an embodiment may significantly reduce a thickness per one layer of the dielectric layer 11 compared to a comparative capacitor, so a laminated number of the inner dielectric layer in the multi-layered capacitor 1 and the capacitance may be remarkably improved under the same conditions as the comparative capacitor.

In addition, an embodiment provides a multi-layered capacitor 1 which is capable of being formed with an ultra-thin film and down-sized and simultaneously to have improved capacitance and relative permittivity.

Meanwhile, an embodiment may provide an electronic device including the dielectric composite. The electronic device may be formed in a single layer of the dielectric composite, or may be formed in a multi-layer as in the multi-layered capacitor 1. The electronic device according to an embodiment may be a kind of a device performing a function of a variable resistor such as a varistor and a thermistor or may be a capacitor for storing energy.

Hereinafter, specific examples are illustrated. However, these examples are exemplary and the scope of the present disclosure is not limited thereto.

Example 1

Starting materials of $TiO_2$ and $SrCO_3$ and a donor element of dysprosium (Dy) are mixed, and the mixture is treated with a ball milling to provide a mixture. The obtained mixture is evaporated and then fired to provide a strontium titanate ($SrTiO_3$) core material having oxygen vacancy. The obtained strontium titanate ($SrTiO_3$) core material has an average particle diameter of about 200 nm.

Separately, $K_2CO_3$, $CaCO_3$, $Nb_2O_5$, $NaNbO_3$ are mixed as a starting material, and the mixture is formed in a pellet. The obtained pellet is heated to provide $KCa_2Na_2Nb_5O_{16}$ powder. The obtained $KCa_2Na_2Nb_5O_{16}$ powder is added into an HCl solution or an $HNO_3$ solution and agitated, and then filtered to provide $HCa_2Na_2Nb_5O_{16}$ powder.

The obtained $HCa_2Na_2Nb_5O_{16}$ powder is added into a tetrabutylammonium hydroxide (TBAOH) aqueous solution and agitated and centrifuged to provide two-dimensional nano sheets. A composition of the two-dimensional nano sheet is $Ca_2Na_2Nb_5O_{16}$. The obtained two-dimensional nano sheet has an average thickness of 2.5 nm and an average particle diameter of 500 nm.

The thickness of the two-dimensional nano sheet may be calculated by analyzing an image taken with an AFM (Atomic Force Microscope).

The average particle of the two-dimensional nano sheet may be calculated by analyzing an image taken with an AFM (Atomic Force Microscope).

Then the obtained two-dimensional nano sheet is coated on a grain boundary of the core material of strontium titanate ($SrTiO_3$) using polyethylenimine as a cationic compound, so as to provide a grain boundary insulation layer including the two-dimensional nano sheet. Thereby, the intermediate product has a structure of a grain boundary insulation layer including a core including a strontium titanate ($SrTiO_3$) core material and a two-dimensional nano sheet surrounding the core.

Then the crystal grain core-grain boundary insulation layer is reduced and fired at 1250° C. under $H_2$ atmosphere in 1% humidity to provide oxygen vacancy to strontium titanate ($SrTiO_{3-\delta}$) in the grain boundary, and it is re-oxidized under humid $N_2$ atmosphere at 1,000° C. to provide a dielectric composite. Then a pair of electrodes consists of In—Ga are formed on the both side of the obtained dielectric composite to provide an intergranular insulation type capacitor according to Example 1. The dielectric composite of the intergranular insulation type capacitor according to Example 1 has a structure corresponded to FIG. 1, and the grain boundary insulation layer has a thickness of about 5 nm.

The thickness of the grain boundary insulation layer may be obtained by a method that distinguishing crystal grains and grain boundaries by using AFM (Atomic Force Microscope) and/or SEM (Scanning Electron Microscope) and thereafter calculating the thickness of the distinguished grain boundaries.

Example 2

An intergranular insulation type capacitor according to Example 2 is prepared in accordance with the same procedure as in Example 1, except that an accepter element of manganese (Mn) is added to the strontium titanate grain boundary during preparing the strontium titanate (SrTiO$_3$) core material. The intergranular insulation type capacitor according to Example 2 has a structure corresponding to FIG. 2, and a rate of the two-dimensional nanosheet in the grain boundary insulation layer is 50 volume %.

In other words, the grain boundary insulation layer according to Example 2 has a structure in which a three-dimensional bulk material including strontium titanate (SrTiO$_3$) having no oxygen vacancy and the accepter element and the two-dimensional nano sheets are combined.

Example 3

An intergranular insulation type capacitor according to Example 3 is prepared in accordance with the same procedure as in Example 2, except that the amount of the two-dimensional nanosheet in the grain boundary insulation layer is adjusted to 70 volume %. The dielectric composite of the intergranular insulation type capacitor according to Example 3 has a structure corresponding to FIG. 2, but an amount of the two-dimensional nanosheet is slightly increased with respect to Example 2.

Example 4

The intergranular insulation type capacitor according to Example 3 is prepared in accordance with the same procedure as in Example 2, except that the amount of the two-dimensional nanosheet in the grain boundary is adjusted to be 90 volume %. The dielectric composite of the intergranular insulation type capacitor according to Example 4 has a structure corresponding to FIG. 2, but the amount of the two-dimensional nanosheet is increased with respect to Examples 2 and 3.

Example 5

The intergranular insulation type capacitor according to Example 5 is prepared in accordance with the same procedure as in Example 1, except that the average particle diameter of the crystal grains is adjusted to be about 100 nm during preparing strontium titanate (SrTiO$_3$). The dielectric composite of the intergranular insulation type capacitor according to Example 5 has a structure corresponding to FIG. 1.

Example 6

The intergranular insulation type capacitor according to Example 6 is prepared in accordance with the same procedure as in Example 1, except that the average particle diameter of the crystal grains is adjusted to be about 300 nm during preparing strontium titanate (SrTiO$_3$). The dielectric composite of the intergranular insulation type capacitor according to Example 6 has a structure corresponding to FIG. 1.

Example 7

The intergranular insulation type capacitor according to Example 7 is prepared in accordance with the same procedure as in Example 1, except that the strontium titanate (SrTiO$_3$) grain boundary is coated with a two-dimensional nano sheet having a composition of Ca$_2$Nb$_3$O$_{10}$ during preparing the grain boundary insulation layer. The dielectric composite of the intergranular insulation type capacitor according to Example 7 has the structure corresponding to FIG. 1.

Example 8

The intergranular insulation type capacitor according to Example 8 is prepared in accordance with the same procedure as in Example 1, except that the crystal grain is prepared with a barium titanate (BaTiO$_3$) instead of strontium titanate (SrTiO$_3$). The dielectric composite of the intergranular insulation type capacitor according to Example 8 has the structure corresponding to FIG. 1.

Comparative Example 1

Starting materials of TiO$_2$ and SrCO$_3$ and a donor element of dysprosium (Dy) are mixed, and the mixture is treated with a ball milling to provide a mixture. The obtained mixture is evaporated and fired to provide a strontium titanate (SrTiO$_3$) having oxygen vacancy. The obtained strontium titanate (SrTiO$_3$) crystal grain has an average particle diameter of about 200 nm.

Then the strontium titanate (SrTiO$_3$) grain boundary is added with an acceptor element of manganese (Mn) and fired under the reduction condition and baked again under the air atmosphere to be re-oxidized to provide a dielectric composite. Then a pair of electrodes consists of In—Ga are formed on the both side of the obtained dielectric composite to provide an intergranular insulation type capacitor according to Comparative Example 1 is obtained.

In the intergranular insulation type capacitor according to Comparative Example 1, the grain boundary insulation layer does not include the two-dimensional nanosheet unlike in FIG. 1, and includes strontium titanate (SrTiO$_3$) with no oxygen vacancy and an acceptor element of manganese (Mn).

Hereinafter, compositions and all properties of intergranular insulation type capacitors according to Examples 1 to 8 and Comparative Example 1 are shown in Table 1.

TABLE 1

| | Crystal grain | | Grain boundary insulation layer | | | Apparent relative permittivity of intergranular insulation type capacitor ($\varepsilon_r$APP) |
|---|---|---|---|---|---|---|
| | Composition | Average particle diameter (nm) | Composition | Two-dimensional nanosheet amount (volume %) | Thickness (nm) | |
| Example 1 | SrTiO$_{3-\delta}$ | 200 | Ca$_2$Na$_2$Nb$_5$O$_{16}$ | 100 | 5 | 9,600 |
| Example 2 | SrTiO$_{3-\delta}$ | 200 | Ca$_2$Na$_2$Nb$_5$O$_{16}$ + SrTiO$_3$ | 50 | 5 | 5,400 |
| Example 3 | SrTiO$_{3-\delta}$ | 200 | Ca$_2$Na$_2$Nb$_5$O$_{16}$ + SrTiO$_3$ | 70 | 5 | 7,080 |
| Example 4 | SrTiO$_{3-\delta}$ | 200 | Ca$_2$Na$_2$Nb$_5$O$_{16}$ + SrTiO$_3$ | 90 | 5 | 8,760 |

TABLE 1-continued

| | Crystal grain | | Grain boundary insulation layer | | | Apparent relative permittivity of intergranular insulation type capacitor ($\varepsilon_r$APP) |
|---|---|---|---|---|---|---|
| | Composition | Average particle diameter (nm) | Composition | Two-dimensional nanosheet amount (volume %) | Thickness (nm) | |
| Example 5 | $SrTiO_{3-\delta}$ | 100 | $Ca_2Na_2Nb_5O_{16}$ | 100 | 5 | 4,800 |
| Example 6 | $SrTiO_{3-\delta}$ | 300 | $Ca_2Na_2Nb_5O_{16}$ | 100 | 5 | 14,400 |
| Example 7 | $SrTiO_{3-\delta}$ | 200 | $Ca_2Nb_3O_{10}$ | 100 | 5 | 4800 |
| Example 8 | $BaTiO_{3-\delta}$ | 200 | $Ca_2Na_2Nb_5O_{16}$ | 100 | 5 | 9,600 |
| Comparative Example 1 | $SrTiO_{3-\delta}$ | 200 | $SrTiO_3$ | 0 | 5 | 1,200 |

Referring to Table 1, it is confirmed that the intergranular insulation type capacitor according to an embodiment has an aspect that an apparent relative permittivity is proportional to an average particle diameter of the crystal grains and a two-dimensional nanosheet amount, which is changed depending upon the composition of the two-dimensional nanosheet.

Meanwhile, the condition of Example 1 is changed as follows, so each intergranular insulation type capacitor according to Examples 9 and 10 and Comparative Examples 2 and 3 is prepared.

Example 9

An intergranular insulation type capacitor according to Example 9 is prepared in accordance with the same procedure as in Example 1, except that the strontium titanate ($SrTiO_3$) core material is formed to provide an average particle diameter with about 1,300 nm, and manganese (Mn) is added as an acceptor element to the strontium titanate grain boundary during preparing the strontium titanate ($SrTiO_3$) core material. The dielectric composite of the intergranular insulation type capacitor according to Example 9, the grain boundary insulation layer is formed to have a thickness of several tens of nanometers. In addition, The dielectric composite of the intergranular insulation type capacitor according to Example 9 has a structure corresponding to FIG. 2, and the amount of the two-dimensional nanosheet in the grain boundary insulation layer is 80 volume %.

Example 10

A strontium titanate ($SrTiO_3$) core material is prepared in accordance with the same procedure as in Example 1, except that the strontium titanate ($SrTiO_3$) core material is formed to have an average particle diameter of about 1,000 nm, and manganese (Mn) is added as an acceptor element to the strontium titanate grain boundary during preparing the strontium titanate ($SrTiO_3$) core material.

Separately, start elements of $K_2CO_3$, $SrCO_3$, $Nb_2O_5$ are mixed, and the mixture is formed in a pellet. The obtained pellet is heated to provide a $KSr_2Nb_3O_{10}$ powder. The obtained $KSr_2Nb_3O_{10}$ powder is added into a HCl solution or an $HNO_3$ solution and agitated and then filtered to provide $HSr_2Nb_3O_{10}$ powder.

The obtained $HSr_2Nb_3O_{10}$ powder is added into a TBAOH aqueous solution and agitated and centrifuged to provide two-dimensional nano sheets. The two-dimensional nano sheet has a composition of $Sr_2Nb_3O_{10}$. The obtained two-dimensional nano sheet has an average thickness of 1.5 nm and an average particle diameter of 500 nm.

Then the obtained two-dimensional nano sheet is coated on the grain boundary of strontium titanate ($SrTiO_3$) core material using a cationic compound of polyethylenimine, so a grain boundary insulation layer including two-dimensional nano sheets is obtained. Thereby, an intermediate product has a grain boundary insulation layer structure including a core of a strontium titanate ($SrTiO_3$) core material and a two-dimensional nano sheet surrounding the core. Then the crystal grain core-grain boundary insulation layer is reduced and fired at 1250° C. under $H_2$ atmosphere in 1% humidity to provide strontium titanate with oxygen vacancy ($SrTiO_{3-\delta}$) in the grain boundary, and it is re-oxidized at 900° C. under the air atmosphere to provide a dielectric composite. Then a pair of electrodes consists of In—Ga are formed on the both side of the obtained dielectric composite to provide an intergranular insulation type capacitor according to Example 10. A grain boundary insulation layer is formed in a thickness of several tens of nanometers in the dielectric composite of the intergranular insulation type capacitor according to Example 10. In addition, the dielectric composite of the intergranular insulation type capacitor according to Example 10 has the structure corresponding to FIG. 2, and an amount of the two-dimensional nanosheet in the grain boundary insulation layer is 80 volume %.

Comparative Example 2

A strontium titanate ($SrTiO_3$) core material is prepared in accordance with the same procedure as in Example 1, except that the strontium titanate ($SrTiO_3$) core material is formed to have an average particle diameter of about 1,300 nm.

Then the obtained strontium titanate ($SrTiO_3$) grain boundary is added with manganese (Mn) as an acceptor element, and then fired under a reduction condition and baked again under the air atmosphere to be re-oxidized, so that an intergranular insulation type capacitor according to Comparative Example 2 is obtained. The dielectric composite of the intergranular insulation type capacitor according to Comparative Example 2, the grain boundary insulation layer is formed in a thickness of several tens of nanometers.

In the intergranular insulation type capacitor according to Comparative Example 2, the grain boundary insulation layer does not include two-dimensional nanosheets unlike FIG. 1 and includes strontium titanate ($SrTiO_3$) having no oxygen vacancy and an acceptor element of manganese (Mn).

Comparative Example 3

An intergranular insulation type capacitor according to Comparative Example 3 is prepared in accordance with the same procedure as in Comparative Example 2, except that the strontium titanate (SrTiO$_3$) core material is formed to have an average particle diameter of about 1,000 nm. In the intergranular insulation type capacitor according to Comparative Example 3, the grain boundary insulation layer is formed in a thickness of several tens of nanometers.

In the intergranular insulation type capacitor according to Comparative Example 3, the grain boundary insulation layer does not include the two-dimensional nanosheet as in Comparative Example 2 and includes strontium titanate (SrTiO$_3$) having no oxygen vacancy and an acceptor element of manganese (Mn).

Hereinafter, the compositions and all properties of intergranular insulation type capacitors according to Examples 9 and 10 and Comparative Examples 2 and 3 are shown in Table 2.

TABLE 2

| | Crystal grain | | Grain boundary insulation layer | | Apparent relative permittivity of Intergranular insulation type capacitor ($\epsilon_r$APP) |
|---|---|---|---|---|---|
| | Composition | Average particle diameter (nm) | Composition | Two-dimensional nanosheet amount (volume %) | Thickness |
| Example 9 | SrTiO$_{3-\delta}$ | 1,300 | Ca$_2$Na$_2$Nb$_5$O$_{16}$ + SrTiO$_3$ | 80 | several tens of nanometers | 4,420 |
| Example 10 | SrTiO$_{3-\delta}$ | 1,000 | Sr$_2$Nb$_3$O$_{10}$ + SrTiO$_3$ | 80 | several tens of nanometers | 7,950 |
| Comparative Example 2 | SrTiO$_{3-\delta}$ | 1,300 | SrTiO$_3$ | 0 | several tens of nanometers | 2,600 |
| Comparative Example 3 | SrTiO$_{3-\delta}$ | 1,000 | SrTiO$_3$ | 0 | several tens of nanometers | 2,300 |

Referring to Tables 1 and 2, it is confirmed that the intergranular insulation type capacitors according to Examples 9 and 10 have larger average particle diameters of the crystal grain than those of Examples 1 to 8, and the thicknesses of the grain boundary insulation layers are also increased in about 5 nm to several tens of nanometers.

Meanwhile, referring to Table 2, it is confirmed that Examples 9 and 10 that the grain boundary insulation layer includes the two-dimensional nanosheet exhibit a superior apparent relative permittivity to those of Comparative Examples 2 and 3 including no two-dimensional nanosheet, with the average particle diameter of the same crystal grain as a reference.

In addition, it is confirmed that referring to Examples 9 and 10, the apparent relative permittivity may be changed in the case that the material of the two-dimensional nanosheet is different even if using the crystal grain core material of the same material including almost similar average particle diameter because $\epsilon_r$APP in Equation 1 is changed depending upon the change of the nanosheet material.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A dielectric composite, comprising:
   a plurality of crystal grains comprising a semiconductor or conductive material, and
   a grain boundary insulation layer between the crystal grains,
   wherein the grain boundary insulation layer comprises a two-dimensional layered material covering at least a portion of a surface of at least one of the crystal grains.

2. The dielectric composite of claim 1, wherein the two-dimensional layered material comprises a single layer.

3. The dielectric composite of claim 1, wherein the two-dimensional layered material comprises two or more laminated layers.

4. The dielectric composite of claim 1, wherein the two-dimensional layered material directly contacts the surface of at least one of the crystal grains.

5. The dielectric composite of claim 1, wherein the two-dimensional layered material covers an entirety of the surface of at least one of the crystal grains.

6. The dielectric composite of claim 1, wherein the two-dimensional layered material has a thickness of less than or equal to about 120 nanometers.

7. The dielectric composite of claim 1, wherein the two-dimensional layered material has a relative permittivity of greater than or equal to about 50 and less than or equal to about 1000.

8. The dielectric composite of claim 1, wherein the grain boundary insulation layer further comprises a three-dimensional bulk material combined with the two-dimensional layered material.

9. The dielectric composite of claim 1, wherein the two-dimensional layered material is present in a range of about 10 volume % to about 100 volume %, based on 100 volume % of the grain boundary insulation layer.

10. The dielectric composite of claim 1, wherein the two-dimensional layered material is delaminated from a material comprising an aurivillius phase, a material comprising a Ruddlesden-Popper phase, a material comprising a Dion-Jacobson phase, titano-niobate, or a combination thereof.

11. The dielectric composite of claim 1, wherein the two-dimensional layered material is represented by Chemical Formula 1:

Chemical Formula 1

$$X_m(A_{(n-1)}B'_nO_{(3n+1)})$$

wherein, in Chemical Formula 1, X comprises H, an alkali metal, a cationic compound, or a combination thereof, A comprises Ca, Na, Ta, Bi, Ba, Sr, or a combination thereof, B comprises W, Mo, Cr, Ta, Nb, V, Zr, Hf, Pb, Sn, La, Ti, or a combination thereof, 0≤m≤2, and n≥1.

12. The dielectric composite of claim 11, wherein X comprises the cationic compound, and the cationic compound comprises a tetramethylammonium compound, a tetraethylammonium compound, a tetrapropylammonium compound, a tetrabutylammonium compound, a methylamine compound, an ethylamine compound, a propylamine compound, a butylamine compound, a polyethylenimine compound, or a combination thereof.

13. The dielectric composite of claim 11, wherein the two-dimensional layered material represented by Chemical Formula 1 is electrically neutral.

14. The dielectric composite of claim 1, wherein the crystal grains comprise barium titanate, strontium titanate, lead titanate, lead zirconate, lead titanate zirconate, or a combination thereof.

15. The dielectric composite of claim 1, wherein the crystal grains have an average particle diameter in a range of about 50 nanometers to about 2 micrometers.

16. The dielectric composite of claim 1, wherein the dielectric composite has a relative permittivity of greater than or equal to about 1,000 and less than or equal to about 20,000.

17. A multi-layered capacitor comprising:
laminated alternate layers comprising
an internal electrode, and
a dielectric layer,
wherein the dielectric layer comprises the dielectric composite of claim 1.

18. The multi-layered capacitor of claim 17, wherein the internal electrode and the dielectric layer comprise three or more laminated layers.

19. The multi-layered capacitor of claim 17, wherein the dielectric layer has a thickness of less than about 500 nanometers.

20. The multi-layered capacitor of claim 17, wherein the dielectric layer has a relative permittivity of greater than or equal to about 4,000 and less than or equal to about 40,000.

21. An electronic device comprising the dielectric composite of claim 1.

22. The electronic device of claim 21, wherein the electronic device is a varistor, a thermistor, or a capacitor for storing energy.

23. The dielectric composite of claim 1, where the grain boundary insulation layer surrounds one or more of the crystal grains.

24. A dielectric composite, comprising:
a plurality of crystal grains comprising a semiconductor or conductive material, and
a grain boundary insulation layer between the crystal grains,
wherein the grain boundary insulation layer comprises a material represented by Chemical Formula 1:

$$X_m(A_{(n-1)}B'_nO_{(3n+1)}) \quad \text{Chemical Formula 1}$$

wherein, in Chemical Formula 1, X comprises H, an alkali metal, a cationic compound, or a combination thereof, A comprises Ca, Na, Ta, Bi, Ba, Sr, or a combination thereof, B comprises W, Mo, Cr, Ta, Nb, V, Zr, Hf, Pb, Sn, La, Ti, or a combination thereof, 0≤m≤2, and n≥1, and wherein the grain boundary insulation layer has a thickness in a range of about 5 nanometers to about 99 nanometers.

* * * * *